United States Patent
Schade et al.

[11] 3,906,037
[45] Sept. 16, 1975

[54] FORMALDEHYDE CONDENSATION PRODUCTS OF TERPHENYL-SULPHONIC ACIDS

[75] Inventors: Franz Schade, Cologne-Buchheim; Reinhard Nebeling, Leverkusen, both of Germany

[73] Assignee: Bayer Aktiengesellschaft, Leverkusen-Bayerwerk, Germany

[22] Filed: Oct. 24, 1969

[21] Appl. No.: 869,373

[30] Foreign Application Priority Data
Nov. 2, 1968  Germany............................ 1806536

[52] U.S. Cl................ 260/505 C; 8/94.24; 252/8.57
[51] Int. Cl........................................... C07c 143/24
[58] Field of Search..................... 260/505 C, 505 R

*Primary Examiner*—Leon Zitver
*Assistant Examiner*—A. Siegel
*Attorney, Agent, or Firm*—Plumley & Tyner

[57] ABSTRACT

Terphenyl-sulphonic acids of the formula

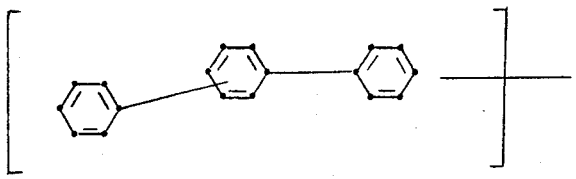

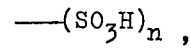

in which n denotes a number of 1 – 4, are condensed with formaldehyde or formaldehyde-yielding agents. The products are useful for the tanning, after-tanning and dyeing of leather.

4 Claims, No Drawings

FORMALDEHYDE CONDENSATION PRODUCTS OF TERPHENYL-SULPHONIC ACIDS

The invention relates to the preparation of condensation products from terphenyl-sulphonic acids and formaldehyde and to the use thereof for the tanning, after-tanning and dyeing of leather.

It is known that the reaction of various aromatic sulphonic acids with formaldehyde leads to condensation products which are used in an acidic or neutral medium as auxiliaries for various operations in the manufacture of leather. For example, it is common practice to use neutral condensation products of naphthalene-sulphonic acids and formaldehyde in the tanning, after-tanning and dyeing of leather, especially chrome leather. When instead of naphthalene-sulphonic acids, diphenyl-ether-sulphonic acids are used in a similar way, for the condensation with formaldehyde, as described in U.S. Pat. No. 2,315,951, then products are also obtained which have the character of tanning auxiliaries but are superior to the aforesaid naphthalene-sulphonic acid condensates in respect of their fastness to light.

It has now been found that condensation products of aromatic sulphonic acids and formaldehyde can be prepared by reacting terphenyl-sulphonic acids of the formula

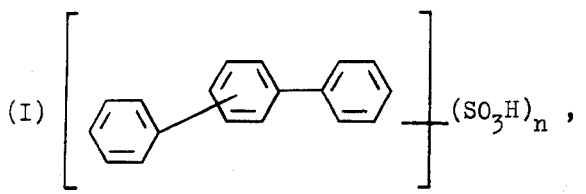

in which $n$ means a number from 1 to 4, which formaldehyde or formaldehyde-yielding agents and, if desired, subsequently neutralising the reaction mixture, completely or in part, by the addition of a base.

Starting materials suitable for the sulphonation of terphenyls are 1,2-, 1,3- and 1,4-terphenyl or their isomeric mixtures. Technical isomer mixtures obtained as byproducts in the synthesis of diphenyl are preferably used. It is possible to use as starting materials distilled isomer mixtures which no longer contain higher polyphenyls such as are likewise obtained in the diphenyl synthesis, as well as crude undistilled products with a content of higher polyphenyls which depends on the reaction conditions of the diphenyl synthesis.

The sulphonation is carried out according to the conventional processes as are described, for example, in U.S. Pat. No. 2,004,546. Of the sulphonating agents customarily used, such as sulphuric acid, chlorosulphonic acid etc., sulphuric acid monohydrate and 20% oleum are particularly suitable. For sulphonation, 1 to 5, preferably 2 to 3 mol of sulphuric acid monohydrate or oleum are heated with 1 mol terphenyl at temperatures lying by about 20° to 30°C above the melting point of the reaction mixture, usually at 60° to 180°C, preferably 100° to 150°C, and the sulphonating mixture is kept at this temperature with constant stirring for about 2 to 3 hours until a degree of sulphonation is achieved which is determined by titre (titration of 1 g of sulphonating mixture with N/5 NaOH until the pH value is 7). When the desired degree of sulphonation has been reached, the sulphonation mixture can be reacted with formaldehyde without further purification or isolation of the resultant terphenyl-sulphonic acids.

The terphenyl-mono- and/or terphenyl-disulphonic acids and/or terphenyl-sulphonic acids of a higher degree of sulphonation, for example, trisulphonic acids, such as are described for individual isomers of terphenyl by C. H. F. Allen and D. N. Burness, Journal of Organic Chemistry 14, 163 (1949), are mixed with preferably 0.4 to 1.0, more preferably 0.5 to 0.75 mol of formaldehyde in the form of a 30 to 40% aqueous solution, as paraformaldehyde or in the form of other formaldehyde-yielding agents. After the addition of formaldehyde, condensation is carried out at 80° to 140°C, preferably 95° to 120°C until the reaction mixture is free from formaldehyde.

Obviously, the reaction can also be carried out under an elevated pressure of, for example, up to 12 atmospheres; this is particularly expedient, for example, if the condensation is carried out at temperatures above about 100°C. For the condensation performed under elevated pressure, temperatures of up to about 200°C may be applied.

The condensation may take 5 to 20 hours, dependent upon the degree of sulphonation.

With a particular method of carrying out the process, the acidic condensation products are adjusted, after completion of the condensation, to a desired final pH-value, for example, pH 3 to 7, with the aid of alkali metal hydroxide solutions or an ammonia solution. The completely or partially neutralised condensation products which can be obtained in this way are particularly suitable for tanning purposes.

It is possible and expedient to transform the completely or partially neutralised condensate solutions into the powdered form by spray-drying.

Compared with the hitherto known tanning auxiliaries based on naphthalene, the novel products are characterised by outstanding fastness to light. Furthermore, the terphenyl-sulphonic acid/formaldehyde condensation products are superior to naphthalene- as well as diphenyl ether-sulphonic acid/formaldehyde condensates by an improved filling and pigmenting effect, particularly in the after-tanning of mineral-tanned leather, which is due to their appreciably higher average molecular weight at a comparable degree of condensation.

In the following Examples the percentages stand for percent by weight, unless otherwise stated.

EXAMPLE 1

230 g 1,3-terphenyl are melted together with 196 g sulphuric acid monohydrate in a three-neck reaction flask with reflux condenser, while stirring, and sulphonated at 95° – 100°C with constant stirring for about 2 hours until the consumption of N/5 sodium hydroxide solution per gram of sulphonation mixture up to pH 7 amounts to 27.5 ml. Condensation is subsequently carried out with 65 g of a 30% aqueous formaldehyde solution for about 20 hours until the reaction mixture is free from formaldehyde. The mixture is then neutralised with an aqueous ammonia solution to pH 6.5 and subsequently spray-dried. Up to 10% of the spray-dried reaction product are clearly soluble in water at 20°C. The neutralised solution of the reaction product as well as the powdered material are eminently suitable as after-tanning agents for mineral-tanned leather, as levelling agents in the dyeing of leather and, in combination with vegetable tanning agents or exchange tanning agents, for self-tannage.

EXAMPLE 2

230 g 1,2-terphenyl are melted together with 294 g sulphuric acid monohydrate in a three neck flask with reflux condenser, while stirring, subsequently heated to 95° – 100°C and sulphonated at this temperature for 2 hours. The consumption of N/5 sodium hydroxide solution up to a pH value of 7.0 amounts to 36.5 ml per gram of sulphonation mixture. 41.5 g of a 40% aqueous formaldehyde solution are added to the sulphonation mixture which pre-dominantly contains terphenyl-1,2-di- and -trisulphonic acids. Condensation is subsequently carried out at 100° – 105°C for about 12 hours until free formaldehyde can virtually no longer be detected. The mixture is then neutralised to a pH value of 6.5 with the aid of an aqueous ammonia solution and spray-dried. The reaction product so obtained, like the product obtained in Example 1, is eminently suitable for after-tanning and as levelling agent in the dyeing of mineral-tanned leather.

Under similar conditions as those described in Example 1 and 2, 1,4-terphenyl can be converted at a sulphonation temperature of 145° – 150°C which is adequate to the high melting point of this isomer, into a corresponding sulphonation mixture, and this can subsequently be condensed with an aqueous formaldehyde solution. After neutralisation and optionally spray-drying, also these products can be successfully used for after-tanning and as levelling agents in the dyeing of chrome leather.

EXAMPLE 3

230 g of technical terphenyl (isomer mixture which is obtained as byproduct in the synthesis of diphenyl and predominantly consists of 1,3- and 1,4-terphenyl and has been freed from higher polyphenyls by distillation) and 196 g sulphuric acid monohydrate are heated with stirring in a three-neck reaction flask to 145° – 150°C and kept at this temperature for about 2 hours. After 2 hours, titration of a sample of 1 g with N/5 sodium hydroxide solution to pH 7 shows a consumption of 27.0 – 28.5 ml. The content of free unreacted sulphuric acid then amounts to about 15.0%. When the desired titre has been reached, the mixture is allowed to cool to 100° – 110°C, and then 100 g of water and subsequently 65 g of a 30% aqueous formaldehyde solution are added. The reaction temperature should not exceed 105° – 110°C. The addition of formaldehyde takes about 30 minutes. After the addition of the predetermined amount of formaldehyde, condensation is carried out with constant stirring until the formaldehyde odour has completely disappeared. The reaction time amounts to about 16 – 20 hours, while the viscosity of the reaction material strongly increases. When the condensation is completed, the mixture is neutralised to a pH value of 6.5 with the aid of a sodium hydroxide solution. After diluting with water to a final concentration of 35 – 45% solids content, the reaction product is ready to be used for the after-tanning of chrome leather or as auxiliary in dyeing or self-tannage. However, it can also be transformed into the powdered form as described in Example 1 and used in powdered form for after-tanning or as auxiliary in self-tannage and dyeing.

EXAMPLE 4

426 g of a sulphonation product obtained as in Example 3 from 230 g of a technical terphenyl isomer mixture, 1.0 g of which consumes 27.0 – 28.5 ml of n/5 NaOH when titrated with N/5 NaOH to a pH value of 7.0, are transferred, after cooling to 100° – 110°C, without further processing, into a stirrer autoclave, mixed with several portions each of 100 g of water and 75 g of a 30% aqueous formaldehyde solution. Condensation is subsequently carried out under a pressure of 5 atm. at 140° – 150°C for 5 hours. When the condensation is completed, the mixture is worked up as in Example 3 to give a neutral condensation product which may be spray-dried and can be used like the condensation product described in Example 3 with good results for after-tanning or as auxiliary in self-tannage and dyeing.

EXAMPLE 5

230 g of a crude undistilled terphenyl isomer mixture (resulting from the diphenyl synthesis and containing, besides 1,2-, 1,3- and 1,4-terphenyl, also higher polyphenyls such as quaterphenyl isomers and the like) and 350 g of 20% oleum are heated with stirring in a three-neck reaction flask with reflux condenser to 130° – 135°C and sulphonated at this temperature for 2 hours. After 2 hours, the consumption of N/5 NaOH per gram of sulphonation mixture amounts to 40 – 42.0 ml. The sulphonation mixture is allowed to cool to 90° – 100°C, and 100 g of water and 65 g of a 30% aqueous formaldehyde solution are successively poured in; the reaction temperature must not exceed 105°C. When the addition is completed, condensation is carried out at 100° – 105°C for 15 hours, the mixture is subsequently neutralised to a pH value of 6.5 with the aid of a 45% sodium hydroxide solution, and expediently spray-dried.

The solubility of the powder present in the form of the sodium salt amounts to about 1 g in 100 g of water at room temperature of 20°C. Also this product has an excellent after-tanning effect and is an excellent levelling agent when used for dyeing prior to or together with the dyestuff. Furthermore, it can be used in combination with vegetable tanning agents or synthetic exchange tanning agents or also with mineral tanning agents for self-tannage.

EXAMPLE 6

230 g of a terphenyl isomer mixture (inevitably obtained in the diphenyl synthesis and free from higher polyphenyls by distillation) and 480 g of sulphuric acid monohydrate are heated to melting point with stirring in a three-neck reaction flask and then kept at a reaction temperature of 140° – 145°C for 2 hours. When the sulphonation is completed, the consumption of N/5 sodium hydroxide solution per 1 g sulphonation mixture amounts to 50.0 – 52.0 ml. The sulphonation mixture is cooled to 100° to 110°C. 100 g of water and 50 g of a 40% aqueous formaldehyde solution are then successively poured in within about 30 minutes. The reaction temperature should not exceed 110°C. Condensation is carried out with stirring for 6 – 8 hours until the formaldehyde is completely used up. Neutralisation of the reaction product and working up can be carried out as described in detail in Examples 1 and 2. The products obtained in this way are eminently suitable for after-tanning and dyeing and, in combination with vegetable tanning agents or with synthetic exchange tanning agents and mineral tanning agents, for self-tannage.

EXAMPLE 7

Calf hides of uniform origin are shaved to 1.2 mm after the usual chrome tannage and, after thorough rinsing, neutralised until the pH value in the moist leather is 3.8 – 4.2 (determined by colouring the cross section of the leather with a solution of bromocresol green). Subsequently, 5% (referred to the shaved weight of the leather) of a condensation product of 1,3-terphenyl-sulphonic acid and formaldehyde which has been prepared according to Example 1, converted with aqueous ammonia into the ammonium salt and spray-dried, are allowed to act on the leather in a rotating drum at a liquor volume of 100% (referred to the shaved weight of the leather) for 45 minutes. Following this after-tanning, dyeing and fat-liquoring can be carried out in the same bath, if desired. After the usual drying and mechanical processing (staking and stretching), there are obtained full and soft leathers of a very good brightening effect and outstanding fastness to light.

Leathers which have been after-tanned by a comparable method with a neutral naphthalene-sulphonic acid/formaldehyde condensation product are appreciably less brightened and substantially more sensitive to the influence of light than the leathers which have been after-tanned with a 1,3-terphenylsulphonic acid formaldehyde condensation product or also with the other condensation products prepared according to the present process. Whereas leathers which have been after-tanned with naphthalene-sulphonic acid/formaldehyde condensates acquire a strong yellow tint already after a few days in daylight, leathers after-tanned, for example, with 1,3-terphenylsulphonic acid/formaldehyde condensation products show no yellowing. Even after illumination in the Xenotest apparatus for 96 hours, the last-mentioned leathers still exhibit no yellowing.

Leathers after-tanned with diphenyl-ether-sulphonic acid/formaldehyde condensates under otherwise identical conditions are noticeably flatter, harder and less brightened than those tanned with the 1,3-terphenyl-sulphonic acid/formaldehyde condensates obtainable according to Example 1.

EXAMPLE 8

For dyeing cow hides which have been chrome-tanned in the usual way, the leather is shaved, neutralised rinsed in a rotating drum with hot water at 45° – 50°C, and treated in 200% of liquor (referred to the shaved weight of the leather) at 45° – 50°C using 1.5% of a condensation product, which has been prepared according to Example 2, neutralised with a sodium hydroxide solution and spray-dried, as levelling agent. It makes no difference to the effect whether the product is added in dissolved form through the hollow shaft or in powdered form through the aperture of the drum. After a running time of 15 minutes, 1.0% (referred to the shaved weight of the leather) of an anionic brown leather dyestuff is added. After a further 45 minutes' running time, the leather is acidified and fat-liquored in the usual way. After drying of the leather and the usual mechanical processing such as staking and stretching, there are obtained full and soft leathers the dyeings of which are characterised by very good levelness and a comparatively low brightening of the colour.

Comparative dyeings in which the terphenyl-sulphonic acid/formaldehyde condensation products are replaced as levelling agents with corresponding naphthalene-sulphonic acid/formaldehyde condensates yield markedly pale dyeings of appreciably poorer fastness to light.

Comparative dyeings in which a diphenyl-ether-sulphonic acid/formaldehyde condensate is used as levelling agent, instead of a product prepared according to the invention, admittedly, yield leathers of equal value in respect of strength of colour and fastness to light. However, they are inferior to the leathers treated with the use of terphenyl-sulphonic acid/formaldehyde condensation products as levelling agents in respect of the characteristic leather properties, especially fullness and softness.

We claim:

1. A condensation product obtained by condensing (1) a mixture of terphenyl-sulfonic acids having the formula

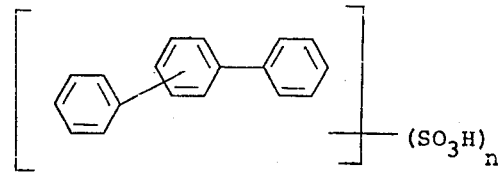

wherein $n$ is a number from 1 to 4 and obtained by heating a mixture of 1–5 moles sulfuric acid monohydrate per mol of terphenyl at 60°–180°C, with (2) 0.4–1.0 mol formaldehyde per mol of said terphenyl-sulfonic acid at a temperature of 80°–140°C.

2. A condensation product according to claim 1 wherein the reaction product is completely or partially neutralized by the addition of a basic compound to produce a salt.

3. A condensation product according to claim 2 wherein a pH value of 3.0 to 7.0 is obtained in the reaction mixture by the addition of ammonia or alkali.

4. A condensation product of claim 2 wherein said basic compound is ammonia or an alkali metal hydroxide, to produce an ammonium salt or an alkali metal salt, respectively.

* * * * *

UNITED STATES PATENT AND TRADEMARK OFFICE
CERTIFICATE OF CORRECTION

PATENT NO. : 3,906,037

DATED : September 16, 1975

INVENTOR(S) : Franz Schade et al

It is certified that error appears in the above-identified patent and that said Letters Patent are hereby corrected as shown below:

Column 1, line 19, after "Pat." ---the word --- Specification---should be inserted.

Column 1, line 45, "which", second occurrence, should read -- with --.

Column 1, line 62, after "Pat." the word --- Specification---should be inserted.

Column 4, line 13, "n/5" should be ---M/5---.

Column 6, line 45, "moles" should be ---mols---.

Signed and Sealed this thirtieth Day of March 1976

[SEAL]

Attest:

RUTH C. MASON  
Attesting Officer

C. MARSHALL DANN  
Commissioner of Patents and Trademarks